United States Patent Office 2,725,362
Patented Nov. 29, 1955

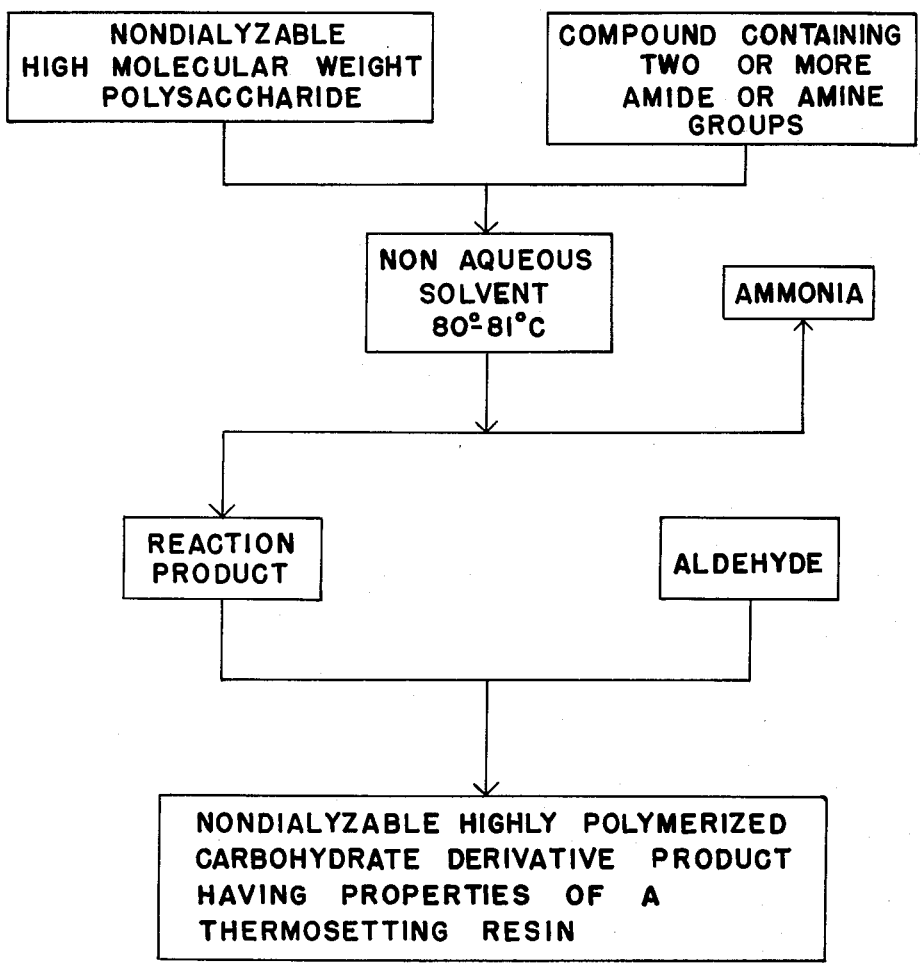

2,725,362

CARBOHYDRATE DERIVATIVES AND PROCESSES OF FORMING THEM

Kenneth M. Gaver, Columbus, Esther P. Lasure, Grove City, and Levi M. Thomas, Columbus, Ohio, assignors to The Keever Starch Company, Columbus, Ohio, a corporation of Ohio Application January 21, 1952, Serial No. 267,412

15 Claims. (Cl. 260—9)

This application is in part a continuation of application Serial No. 760,342, filed July 11, 1947.

This invention disclosed herein relates to carbohydrate derivative products having the properties of thermosetting resins and to processes for forming such carbohydrate derivative products. The embodiments of the invention disclosed relate particularly to carbohydrate derivative products formed by the reaction of amidogen carbohydrate compounds (such as amidogen starch compounds and other amidogen glucopyranose polymers which may be formed as described in our Patent 2,538,903, granted January 23, 1951) with aldehydes and with other condensing agents of a similar type and to processes for the synthesis thereof.

In the usual formation of synthetic resins the compounds used initially are compounds which have low molecular weights and relatively speaking, are not highly polymerized. Heretofore, therefore, the highly polymerized product desired has been obtained by extensive polymerization of simple compounds. We have conceived that it is of great advantage to start with compounds which in their native or original state are themselves highly polymerized so that less chemical reaction is required to obtain the finally highly polymerized product and therefore less work, manipulation, heat, etc. may be required. Happily we find in starch and similar high molecular weight nondialyzable polysaccharides, compounds which are relatively inexpensive. Therefore our process leads to great economies not only in operation but also in the cost of the materials used. Therefore we use high molecular weight polysaccharides such as cellulose, starch, acid and enzyme converted dextrins, and certain gums which high molecular weight polysaccharides are all nondialyzable. Generally soluble saccharides such as the usual sugars while in certain cases operable according to our process are not preferred, because their initial polymerization is not sufficiently high to secure the greatest advantages of our invention.

In one particular embodiment, our invention contemplates the reaction of starch with urea in a nonaqueous system at a temperature of 81° C. or higher, to form a starch carbamate and the subsequent reaction of the starch carbamate with formaldehyde to form a carbohydrate derivative product having the properties of thermosetting resins. In other particular embodiments, it contemplates the similar reaction of starch with other amidogen compounds such as, for example, an amine, or another amide, to form starch reaction products having amidogen groups and the subsequent reaction of these starch reaction products with aldehydes such as formaldehyde, furfural, etc. In other embodiments other high molecular weight polysaccharides may be similarly reacted with amidogen compounds and then reacted with similar condensing agents to form carbohydrate derivative compositions containing amidogen and formaldehyde residues and containing also a very large amount of starch or other high molecular weight polysaccharide. From such compositions by further polymerization, there can be obtained resins from which there can be made molded, materials which are economical of manufacture and which, while superior in certain respects, are in other respects substantially on a par with conventional resinous "plastic" compositions and products in appearance, utility, etc.

As used in this specification and claims we define "amidogen compounds" to mean compounds having the radical $NH_2$ which is known only in combination in amines, amides and their derivatives. The amidogen compound may thus be an amide, an amine or a compound containing either one or more amide or amine groups. Some of the intermediate compounds which we have obtained are such compounds.

One of the intermediate compounds we have obtained is a compound which we call a carbohydramate. We define "carbohydramate" to mean "a compound derived from a carbohydrate having an amido-containing group substituted for the hydrogen atom of each of one or more of the several hydroxyl groups of each of the units of the carbohydrate molecules so as to form an amide ester"; a specific compound exemplary of the above which we have formed and which we react to form a desired product is designated a "starchamate," which term we define to mean "a compound derived from starch, composed of an undetermined number of polymerized glucopyranose units wherein an amido-containing group is substituted for the hydrogen atom of each of one or more of the several hydroxyl groups of each of the starch units so as to form a polymerized compound which in fact is an amido starch ester"; another specific carbohydrate compound which we react to form a desired product is a "carbohydramine," which term we define to mean "a compound derived from a carbohydrate having an amino-containing group substituted for the hydrogen atoms of each of one or more of the several hydroxyl groups of each unit of the carbohydrate molecules so as to form an amino derivative"; a specific compound exemplary of the above and derived from starch which we utilize, we call a "starchamine," which term we define to mean "a compound derived from starch composed of an undetermined number of polymerized glucopyranose units wherein an amino-containing group is substituted for the hydrogen atom of each of one or more of the several hydroxyl groups of each of the starch units so as to form polymerized compounds"; and another compound which we have utilized to form desired products, we call a "starchate," which term we define to mean "a compound composed of an undetermined number of polymerized glucopyranose units wherein a metallic or nonmetallic atom or organic or inorganic radical is substituted for the hydrogen atom of each of one or more of the several hydroxyl groups of each of the starch units so as to form a polymerized compound which in fact is (or at least is analogous to) an alcoholate or ether of starch." It is to be noted however that "starchates" includes "starchamines," "starchamates" and other starch derivatives.

Certain prior art proposals may be mentioned here:

(1) It has been proposed by other workers in this field, prior to our invention, to mix urea and other amidogen compounds with starch, cellulose and other high molecular weight polysaccharides for various purposes which inevitably involve a series of degradation or depolymerization lower molecular weight products of the polysaccharides. For example, such processes have been proposed for the purpose of making starch swell so that it is converted into dextrins for making adhesives, or for making it more nearly soluble. Processes have been proposed also for treating cellulose or cellulose derivatives to depolymerize them for various purposes such as, for example, for the improvement of the weight or length of synthetic yarns, etc., or for the improvement of the ironing qualities. These prior art processes often provide for the treating of the polysaccharide in the presence of water.

(2) It has been proposed to treat starches and other high polymer saccharides with formaldehyde for various purposes including the preparation of adhesives, the preparation of non-gelatinizable starch, the preparation of food products, and for releasing the formaldehyde as a disinfectant. In such processes the formaldehyde and the carbohydrate are not united by primary valence.

(3) Sucrose and other low molecular weight sugars and other saccharides have been treated with urea and thereafter the product has been treated with an aldehyde to form a resin. Such a process, of course, is different from the basic idea of our invention as disclosed herein in that in such processes the workers start with a low polymer rather than with a high polymer. Thus they defeat the very idea of our invention. Such processes involve usually the melting of the urea and are operated consequently at a very high temperature. Frequently they use relatively high quantities of acids. If such processes were applied to starch both of these factors (high temperatures and acids) would tend to degrade or depolymerize the starch. Moreover, these processes if applied to starch, would be impractical for they not only run the danger of degrading the starch at the temperatures involved, or by the acids used, but they would create also great difficulties in attempting to avoid such degradation. Starch itself, if not degraded, would be insoluble in molar quantities of urea and would not react as proposed.

(4) Some workers have also attempted to apply such processes to starch and other high molecular weight polysaccharides, but in so doing they have always depolymerized the starch by acid or heat and changed it into a low molecular weight saccharide such as a dialyzable dextrin thus converting it into a substance which is soluble in the molten urea and thus have gone exactly in the opposite direction from the teaching of our invention herein.

(5) Finally some workers have prepared resins such as ketone-formaldehyde resins and urea-formaldehyde resins and then have mixed such resins with carbohydrate. In such a situation, the carbohydrate does not enter into the resin polymer by a primary valence. In our improved process, on the contrary, we first tie the urea firmly on the number 2 carbon of the high molecular weight nondialyzable polysaccharide by a reaction which involves the liberation of ammonia, but retains the high molecular weight polymer of the polysaccharide, and its nondialyzable quality. After we have done this we react a condensing agent such as formaldehyde or furfural with one of the remaining amidogen groups which is thus tied firmly to the polysaccharide.

We use a raw material which is plentiful and relatively cheap. We react it in a manner in which the reaction is quick and little heat or manipulation is required. We start with a highly polymerized compound and we retain the original structure (e. g. the starch skeleton) throughout.

One of the objects of the invention therefore, is the provision of carbohydrate derivative products having certain superior characteristics.

A further object of the invention is the provision of methods for forming such carbohydrate derivative products.

A further object of our invention is the provision of new and useful processes of forming various new products from starch.

A further object of the invention is the provision of new carbohydrate derivative products having properties of thermosetting resins but containing a major part of a relatively inexpensive polysaccharide material such as starch.

A further object of the invention is the provision of new methods of forming carbohydrate derivative products having properties of thermosetting resins.

Further objects and features of the present invention will be apparent from the following description, reference being had to the accompanying drawings where a preferred form of embodiment of the invention is clearly shown.

In the drawings:

The figure is a diagrammatic showing of an embodiment of our invention comprising a process of forming a carbohydrate derivative product having properties of thermosetting resins in accordance with the invention.

As is indicated by the drawing, a polysaccharide may be reacted with an amidogen compound by being heated therewith to a temperature of from 80–81° C. or higher to produce an amidogen carbohydrate reaction product. The amidogen compound should be reacted with the carbohydrate in a nonaqueous solvent. The product is then mixed with a condensing reactant such as an aldehyde to form the desired carbohydrate derivative product. The mixture may be heated (in order to initiate the condensing reaction) until the mass becomes very viscous. Preferably the amidogen carbohydrate reaction product is mixed with the condensing reactant in solution and the solven is evaporated by the heat used to initiate the condensing reaction. After the desired carbohydrate derivative product is obtained it may be further reacted and more highly polymerized. To do so there is usually added a polymerizing reactant which may be an additional quantity of the same amidogen compound or a suitable amount of a different amidogen compound and the mixture may be heated again with a polymerizing catalyst. The carbohydrate derivative which we form resembles a urea-formaldehyde resin but is much less expensive and has certain more desirable characteristics.

The carbohydrate used in the first reaction specified above may be starch or any other similar high molecular weight polysaccharide. Cellulose, starch, and acid and enzyme converted nondialyzable dextrins are preferred. Inulin and certain gums such as acacia, locust bean and karaya gums are usable. Generally soluble saccharides including the usual sugars and dialyzable dextrins are not preferred. The dextrins which we prefer to use are those which have a higher degree of polymerization and are insoluble in water and nondialyzable such as the acid and enzyme converted dextrins. In all such carbohydrates, we have found that the hydroxyl next to the carbonyl group will react best at about 80–81° C. or higher up to 115° C. The carbohydrate used will usually be one having pentose or hexose units although carbohydrates having more or less carbons in the basic unit are usable. The amidogen compound used in the first reaction specified above may (with the qualifications set out below) be an amine or an amide or a derivative of either.

As stated above, we found that it was impossible to react simple ammonium hydroxide with starch in a manner similar to that which sodium and potassium hydroxide react or to react ammonia directly with starch. Moreover, we found that it was impossible to substitute an amino or amido radical in an alkali metal starchate in place of the sodium or potassium group and thus form amino or amido starches. The inventions disclosed in Patent 2,538,903 are based upon the discovery that when a carbohydrate is reacted directly with an amine or an amide in a nonaqueous solvent at a temperature of 81° C. or higher, with or without agitation, a reaction will occur which will go practically to completion provided there is sufficient reactant present for this to occur.

Such reaction products may be prepared using all sorts of starches, cellulose (such as cotton, linen, jute, ramie) and high molecular weight dextrins. They can also be prepared using lower molecular weight dextrins, some sugars such as sucrose, glucosides, dextran, and inulin. However, the peculiar advantages of our invention are not as marked with such lower weight molecular compounds inasmuch as our great advantage lies in starting with a highly polymerized high molecular weight compound such as cellulose, starch and the higher dextrins. All of the high molecular weight polysaccharides which we tested reacted similarly.

We have found that any alcohol is suitable as solvent in the first reaction as is evidenced by the use of the following alcohols and others which we have found which may be used as solvents in preparing such carbohydrate esters and derivatives provided certain other variables are sufficiently controlled as will be discussed later.

| | |
|---|---|
| Iso-amyl | Ethyl |
| n-Amyl | 2-ethyl butyl |
| Sec.-amyl | Methyl |
| n-Butyl | Methyl amyl |
| Iso-butyl | Tert.-amyl |
| Sec.-butyl | n-Propyl |
| Tert.-butyl | Iso-propyl |

Substantially any organic solvent is suitable as is evidenced by the use of the following organic solvents which may also be used similarly:

| | |
|---|---|
| Benzene | n-Pentane |
| Cyclohexane | Petroleum ether |
| Heptane | Toluene |
| Hexane | Trimethyl butane |
| Nonane | o-Xylene |
| n-Octane | m-Xylene |
| Iso-octane | p-Xylene |
| and various others. | |

Ketones may also be used similarly as is evidenced by the use of the following:

Acetone
Acetophenone
and various others.

Ethers may also be used similarly as is evidenced by the use of the following:

| | |
|---|---|
| n-Amyl | n-Hexyl |
| Iso-amyl | n-Propyl |
| Ethyl butyl | Iso-propyl |
| Ethyl | and various others. |

It is clear, therefore, that all nonaqueous solvents capable of dissolving the amine or amide to the extent necessary are satisfactory. However, attempts to condense the reactants in a water solution failed.

It must be understood, however, that all these solvents mentioned do not have the same utility in the process. However, any solvent which will dissolve the amine or amide used even in small amounts, is a suitable vehicle in which to carry out the reaction. As the reactants in solution condense they go out of solution leaving the solvent available for additional increments of the reactants. With some of these solvents the reaction is limited to a single mole of the amidogen compound. For example, with starch in butanol, only one mole of urea will react. The urea condenses with the number two carbon of the starch units. However, with pure toluene, greater quantities of urea will react, apparently causing substitutions on other carbons of the starch unit. As stated above, the carbohydrates and the amidogen compounds will react in substantially any nonaqueous solvent but the solvent must be nonaqueous.

REACTANTS

Every amide tested reacted as desired in the first reaction. Long chain amides (i. e. stearamide, palmitamide, etc.) react only slightly with the long chain polysaccharides such as starch but react freely with carbohydrates of lower molecular weight such as sucrose. The reacting amide should contain two free amido or amino groups so that the reaction product will have at least one free amido or amino group.

A partial list of suitable reactants includes:

Group I

| | |
|---|---|
| Melamine | Guanylurea |
| Oxalamide | Guanidine |
| Urea | Dicyandiamide |
| Thiourea | |
| and similarly acting amides. | |

Group II

| | |
|---|---|
| Ethylene diamine | Triethylene tetramine |
| Diethylene triamine | Propylene diamine |
| Tetraethylene pentamine | 1,3-diamino butane |
| and similarly reaction amines. | |

TEMPERATURE

A temperature of at least 80–81° C. in the first reaction appears to be critical. During the condensation in pure toluene of reactants containing two or more amido or amino groups, as soon as the temperature reaches 80–81° C. the product suddenly agglomerates and settles out of the reaction mixture. Simultaneously with the agglomeration of the product ammonia is evolved, one mole of ammonia being evolved for each mole of reactant entering the carbohydrate unit or molecule. Where the solvent is butanol or a similar alcohol or a mixture of such an alcohol with toluene, the ammonia is evolved as soon as the temperature reaches 80–81° C. but the product does not agglomerate or settle out but remains in suspension.

PRESSURE

Since the reaction of the compounds containing a plurality of amides or of amines as described herein involves the evolution of ammonia and since the ammonia has a greater volume than it had in combination in the reactant, the use of pressure in such reactions would interfere with the reaction itself and the use of pressure must be avoided. A vacuum can be utilized if desired to drive the reaction to completion.

AGITATION

Where the reaction we are describing is initiated in butanol, in a similar alcohol or in a mixture of such an alcohol with toluene we can continue efficient agitation until we are sure that the carbohydrate is all condensed with amidogen compounds. However, when the reaction is initiated in pure toluene, as soon as the reaction is initiated the reaction product settles from the reaction mixture as a rubber-like mass. Usually this mass is so heavy it stops the agitator. However, the reaction apparently proceeds uninterruptedly. Better yields in a shorter reaction time are possibly obtained with efficient agitation as, for example, in butanol, but nothing that we have as yet observed indicates that agitation is necessary.

LIMITATION TO MONO PRODUCT

By the use of butanol and similar alcohols either alone or in combination with toluene we can also insure that the product is a pure mono derivative inasmuch as with such alcoholic solvents only a mono substitution on the 2-carbon is accomplished.

TIME

No exact definition of the time effect can be given. In repeated preparations we have been able to discern no differences between slow heating and rapid heating. Neither were we able to detect any differences between laboratory and pilot plant operations as far as time was concerned.

MECHANISM

Where starch and other high molecular weight polysaccharides are treated with an amine or amide at 81° C. and above, in a suitable anhydrous solvent for the amide or amine, this first step reaction proceeds as is illustrated in the following equations relating to starch in which R may be hydrogen or any organic radical and where R' is an active functional group as, for example, a hydroxyl or a nitrogen group:

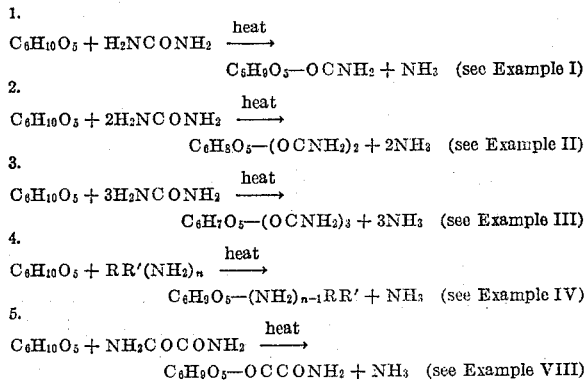

1. $C_6H_{10}O_5 + H_2NCONH_2 \xrightarrow{heat}$
$C_6H_9O_5—OCNH_2 + NH_3$ (see Example I)

2. $C_6H_{10}O_5 + 2H_2NCONH_2 \xrightarrow{heat}$
$C_6H_8O_5—(OCNH_2)_2 + 2NH_3$ (see Example II)

3. $C_6H_{10}O_5 + 3H_2NCONH_2 \xrightarrow{heat}$
$C_6H_7O_5—(OCNH_2)_3 + 3NH_3$ (see Example III)

4. $C_6H_{10}O_5 + RR'(NH_2)_n \xrightarrow{heat}$
$C_6H_9O_5—(NH_2)_{n-1}RR' + NH_3$ (see Example IV)

5. $C_6H_{10}O_5 + NH_2COCONH_2 \xrightarrow{heat}$
$C_6H_9O_5—OCCONH_2 + NH_3$ (see Example VIII)

As explained, a polysaccharide heated with an amidogen compound (an amide or amine) to a temperature of 81° C. gives a reaction product. If the amidogen compound is an amide, ammonia is evolved and a carbohydrate ester is formed. If starch is used and is heated with an amide, ammonia is evolved and a starch ester is formed. If the amidogen compound is a polyamide, as for example, a diamide, either a carbohydramate or a starchamate is formed, ammonia being evolved in each case. It follows that if starch is similarly heated with urea, a starchamate is formed with evolution of ammonia. If starch or other carbohydrate is heated with a polyamine, a starchamine or carbohydramine is formed, with evolution of ammonia in each case.

In the reactions described above, the amides (where the solvent is satisfactory such as toluene, for example, and where there is a sufficient quantity of the amide present as in Examples II and III) form di and tri amide starchamates. They form 2-mono amide-starchamates where only the proper stoichiometric quantity is present for the mono product. We believe that the products of Examples I and III are respectively substantially pure mono and tri amide starchamates only but that possibily the product of Example II may in certain cases contain relatively small proportions of mono and tri urea starchamates as well as a large proportion of diamide starchamate. In all cases, one amide group is carried by the number two carbon. Other amide groups are probably (in the cases of di and tri amide starchamates) carried by the 3 and 6 carbons. When a glucopyranose polymer is reacted as stated above to replace the hydrogen of the hydroxyl next to the carbonyl group of substantially all of the individual units of the polymer by an amido group or an amino group, each glucopyranose unit of the polymer so replaced will have a formula as follows:

For an amido replacement:

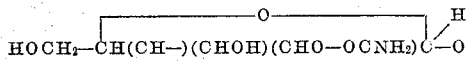

HOCH₂—CH(CH—)(CHOH)(CHO—OCNH₂)C—O

For an amino replacement:

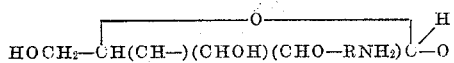

HOCH₂—CH(CH—)(CHOH)(CHO—RNH₂)C—O

In designating these products with reference to the glucose unit in carbohydrate chemistry, they should be called 2-amido glucopyranose polymers and 2-amino glucopyranose polymers. Preferably, to avoid confusion, we will usually designate them as "polymerized amido glucopyranose units in which the amide group is carried by the second carbon of the glucose chain" and as "polymerized amino glucopyranose units in which the amine group is carried by the second carbon of the glucose chain."

Some further details of the process of forming the amidogen carbohydrate reaction products are disclosed in our Patent 2,538,903, issued January 23, 1951.

We have also discovered that our amido and amino containing higher molecular weight polysaccharides may be mixed with condensing aldehydes such as formaldehyde, furfural, etc. and will then react to produce a high molecular weight carbohydrate derivative product which has thermosetting resin properties. A polymerizing catalyst aids the reaction but is not necessary. Heat also quickens the reaction but is not necessary if the amidogen polysaccharide has been cooked prior to addition of the condensing aldehyde.

The condensing agent used in this second reaction may be any usual condensing agent such as, for example, formaldehyde, furfural and other aldehydes, and substances yielding aldehydes such as, for example, paraformaldehyde, etc. or any combinations of such agents.

Thus, in accordance with the above, any amidogen polysaccharide derivative as, for example, a compound consisting of polymerized amido glucopyranose units in which the amide group is carried by the second carbon of the glucose chain, herein called a "carbohydramate" may be treated with a condensing agent such as formaldehyde, furfural, etc. in the presence of a condensing catalyst if desired. In such cases, a condensation will occur to yield a rubber-like carbohydrate derivative which is precipitated and which on drying, exhibits the properties required for a thermosetting plastic.

If a compound consisting of polymerized amino glucopyranose units in which the amine group is carried by the second carbon of the glucose chain, herein called a "carbohydramine" is to be treated, it may be a starch derivative of the amino type (e. g. a "starchamine") as, for example, the reaction product of starch with any polyamine $(RNH_2)_x$ where $x$ is two or more, e. g. hexamethylene tetramine, or any other polymerized amine glucopyranose units in which the amine group is carried by the second carbon of the glucose chain, herein called "carbohydramine."

Amidogen carbohydrate derivatives such as a starch derivative of the amide type (e. g. mono-, di- and tri- substituted urea starchates) are satisfactory. We prefer to use polymerized amido starch units in which the amide group is carried by the second carbon of the glucose chain, herein called "starchamates" such as urea and thiourea and melamine starchates (mono-, di- and tri-). However, condensation products of starch with oxalamide and similar di-amide compounds will function. In each case, it is necessary that two amidogen groups be present in the original amidogen compound which thus can be designated as $R(CONH_2)_x$ where $x$ is two or more. One of these two amidogen groups becomes attached to the starch and the other is left free for condensation. Amidogen compounds having two amidogen groups, one of which is an amido group and one of which is amino group $(NH_2)_y—R—(CONH_2)_z$ where $y$ and $z$ each represent either one or more than one, are satisfactory for reaction with a carbohydrate in the initial reaction. In such cases an amidogen carbohydrate derivative is formed which (where $z$ equals at least one and $y$ is equal to or greater than $z$) is predominantly an amino starch or a starchamine and which will react with the condensing agent to form a carbohydrate derivative product, of a thermosetting type.

For condensation with the condensing reactant, compounds consisting of polymerized amino starch units in which the amine group is carried by the second carbon of the glucose chain, herein called "starchamines," such as monodiamino, monotriamino, monotetramino, and monopentamino starch derivatives may be used alone or in combination with urea or thiourea. Amido starch units in which the amido group is carried by the second carbon of the glucose chain, herein called "starchamates," such as the mono-, di- and tri-amido starches, may be reacted with the condensing reactant either alone or with such monosubstituted amino starch units in which the amine group is carried by the second carbon of the glucose chain, herein called "starchamines," or with urea and/or thiourea or with urea and/or thiourea and one or more of such starchamines.

The condensing agent may be formaldehyde, furfural or any of the usual aldehyde condensing agents or combinations thereof. The acid catalyst may be any of the usual aliphatic acids such as acetic, lactic, formic, oxalic, citric, etc.; any of the usual aromatic acids such as benzoic, salicylic, etc.; any of the usual inorganic acids such as phosphoric, hydrobromic, hydrochloric, etc. Acid salts such as sodium acid sulfate, potassium acid oxalate, aniline hydrochloride, etc. are satisfactory as polymerization catalysts.

Following are examples of our processes:

EXAMPLES

Example I (Illustration of Equation 1 above)

We mixed:

100 lbs. of corn starch (5–7% moisture)
35 lbs. of urea
50 gallons of toluene

The mixture was heated with agitation and slow distillation until about 10 gallons of distillate had been collected. Ammonia was evolved in the reaction. The product was filtered on centrifuge, washed with toluene and dried in a rotary vacuum dryer at a temperature below 160° C. The dried product was a starch carbamate, weighed 111 lbs., and contained 6.75% nitrogen (calculated 6.83%). The distillate contained ammonia.

Example II (Illustration of Equation 2 above)

We mixed:

100 lbs. of rice starch (5–7% moisture)
70 lbs. of urea
50 gallons of toluene

The mixture was heated with agitation and slow distillation until about 10 gallons of distillate had been collected. The product was filtered on a centrifuge, washed with toluene and dried in a rotary vacuum dryer at a temperature below 150° C. The dried product weighed 150 lbs. and contained 11.5% nitrogen (calculated for the di substituted product—11.3%). The distillate contained ammonia.

Example III (Illustration of Equation 3 above)

We mixed:

100 grams of wheat starch (5–7% moisture)
105 grams of urea (excess)
1000 ml. toluene The mixture was heated with agitation and slow distillation until 250 ml. distillate had been collected. The product was filtered on suction, washed with toluene and then with ether and then air dried. Ammonia was evolved in this reaction. The product solvated at the reaction temperature but was easily desolvated with ethyl ether. The air dried product weighed 177 grams and contained 14.1% nitrogen (calculated 14.4%).

Example IV (Illustration of Equation 4 above)

We mixed:

50 grams of corn starch (5–7% moisture)
50 grams of diethylene triamine
500 ml. toluene The mixture was heated with agitation and slow distillation until 250 ml. distillate had been collected. The product was filtered on suction, washed with toluene and then with ether and then air dried. Ammonia was evolved in this reaction. Air dry weight was 69.4 grams and the product was very hygroscopic. At the end of the reaction period the reaction product existed as a rubber like mass. The distillate was very alkaline.

Example V

We mixed:

50 grams of dry rice starch
500 ml. of toluene
30 grams of thiourea

The mixture was heated with agitation and slowly distilled until 250 ml. of distillate had been collected. The product was filtered on suction and washed with toluene and then with ether and air dried. Ammonia was evolved in this reaction. Air dry weight was 75 grams (calculated 72 grams). In this reaction the product first agglomerated and then broke up into small granules. It filtered easily.

Example VI

We mixed:

50 grams of thin boiling wheat starch
500 ml. of toluene
50 ml. of tetraethylene pentamine together in an open beaker and heated on a steam bath at 100° C. until half the toluene had evaporated. The remaining toluene was decanted from the sirupy product and the product granulated with ether and filtered and air dried. The product weighed 79.5 grams (calculated 83 grams) and was very hygroscopic.

Example VII

We used:

300 gal. anhydrous butanol
100 gal. toluene
800 lbs. commercial thick wheat starch (approximately 12% moisture)
200 lbs. powdered urea.

The starch and solvent were heated to about 60° C. The powdered urea was added and the heating was continued to 110° C. The evaporating toluene carried the ammonia by-product out of the system thus permitting the reaction to proceed uninterruptedly, it being known that accumulated ammonia would have inhibited the reaction. After the temperature of 110° C. had been reached, the solution was cooled to below 70° C., filtered and dried in a rotary vacuum dryer at a temperature kept below 160° C. The dried product was a starch carbamate (monoamide), weighed 864 lbs., and contained 6.88% nitrogen (calculated 6.83%).

Eight hundred gallons of 5% formaldehyde solution was heated with the 864 lbs. of the starch carbamate for 30 minutes and then dried in a vacuum dryer at about 140° and pulverized.

Example VIII

We mixed:

100 grams thin boiling corn starch
50 grams oxalamide
1000 ml. toluene

The mixture heated with agitation and slow distillation for 30 minutes. The product was filtered on suction, washed with toluene and then dried at a temperature kept below 160° C. The dried product was the half amide of the oxalic acid half ester of starch (i. e. a mono amide), weighed 141 gms. and contained 5.95% nitrogen (calculated 6.00%). The distillate contained ammonia.

The product was then heated 30 minutes with 1500 ml. of 1.5% formaldehyde and dried in a vacuum at about 140° F., and pulverized.

Example IX

We mixed:

100 grams air dry corn dextrin (81 grams dry weight)
100 ml. ethylene diamine
500 ml. butanol The mixture heated with agitation and slow distillation until 250 ml. distillate had been collected. The product was filtered on suction, washed with toluene and then with ether and air dried. Ammonia was evolved in this reaction. Air dry weight was 111 grams. The product was very alkaline but the alkalinity disappeared on treatment with formaldehyde. It also gave a purple color with iodine. It dispersed in warm water to give a thick gel having good filming properties and giving a very flexible film. Nitrogen content was 5.96% (calculated 6.3%). One hundred grams of this product was dispersed in 500 cc. of water. An excess of formaldehyde was added. The product was then evaporated to dryness.

Example X

Sixty ml. of 40% formaldehyde solution was heated with 30 g. of starch carbamate prepared as explained in Example I. A little urea was added to react with the excess formaldehyde and the solution was further evaporated under a vacuum. Lactic acid catalyzed the condensation. This mass was then polymerized and hardened by heating over 80° C. with a catalyst for a period of time. The resulting product was fairly stable toward water.

Example XI

Sixty ml. of 40% formaldehyde solution was heated with 30 g. of starch carbamate prepared as explained in Example I. A little urea was added to react with the excess formaldehyde and the solution was further evaporated under a vacuum. Phosphoric acid catalyzed the condensation.

Example XII

Sixty ml. of 40% formaldehyde solution was heated with 30 g. of starch carbamate prepared as explained in Example I. A little urea was added to react with the excess formaldehyde and the solution was further evaporated under a vacuum. Acetic acid catalyzed the condensation.

Example XIII

Sixty ml. of 40% formaldehyde solution was heated with 30 g. of starch carbamate prepared as explained in Example I. A little urea was added to react with the excess formaldehyde and the solution was further evaporated under a vacuum. Formic acid catalyzed the condensation.

Example XIV

Ten g. of triurea carbamate were soaked for fifteen minutes in 132 ml. of formalin. This mixture was boiled for a few minutes under reflux.

Among other uses, the products of our invention are useful as paper coating resins. They are not soluble either in water or in other ordinary solvents. They are flexible. They are economical because the starting materials are relatively cheap and in large supply and the products can be manufactured fairly quickly. We start with a highly polymerized compound such as starch and we retain this highly polymerized skeleton throughout.

While the main advantages of our invention are realized in such highly polymerized compounds as starch and the higher dextrins, yet we may point out that our process will also operate with lower polymers such as inulin, gum, the lower dextrins and some of the gums. The number of carbons in the saccharide unit of the polysaccharide used is not limited but usually the process will apply to polysaccharides having pentose and/or hexose units. In any case, the reaction is on the number 2 carbon (i. e. the carbon next to the carbonyl group).

As stated, a catalyst is preferred in the second step in which the compound is condensed with the aldehyde but is not required. Heating is not required in this second step if the amidogen substituted polysaccharide is precooked before mixing with the aldehyde.

While the forms of embodiments of the present invention as herein disclosed constitute preferred forms, it is to be understood that other forms might be adopted, all coming within the scope of the claims which follow.

We claim:

1. The process for producing an insoluble water resistant highly polymerized carbohydrate derivative product having the properties of a thermosetting resin which comprises reacting a uniformly 2-substituted high molecular weight polysaccharide having a $NH_2$ containing substituent carried by the second carbon of the monosaccharide units of the uniformly substituted polysaccharide prepared by mixing a non-dialyzable higher molecular weight polysaccharide with a lower alkyl amidogen compound having not more than four carbons in the alkyl group and having a plurality of amidogen groups selected from the class consisting of amides and amines, said compounds being mixed at a temperature in the range of from 80° C. to 115° C. in a nonaqueous system wherein there is provided a nonaqueous solvent for the lower alkyl amidogen compound having a boiling point at atmospheric pressure higher than 80° C., to react said polysaccharide and amidogen compounds with the liberation of ammonia to form said uniformly 2-substituted high molecular weight polysaccharide having a $NH_2$ containing substituent carried by the second carbon of the monosaccharide units of the uniformly substituted polysaccharide; with an aldehyde to produce said insoluble water resistant highly polymerized carbohydrate derivative product having the properties of a thermosetting resin.

2. The process for producing an insoluble water resistant highly polymerized carbohydrate derivative product having the properties of a thermosetting resin which comprises reacting a uniformly 2-substituted high molecular weight polysaccharide having a $NH_2$ containing substituent carried by the second carbon of the monosaccharide units of the uniformly substituted polysaccharide prepared by mixing a non-dialyzable higher molecular weight polysaccharide with a lower alkyl amidogen compound having not more than four carbons in the alkyl group and having a plurality of amidogen groups selected from the class consisting of amides and amines, said compounds being mixed at a temperature in the range of from 80° C. to 115° C. in a nonaqueous system wherein there is provided a nonaqueous solvent for the lower alkyl amidogen compound having a boiling point at atmospheric pressure higher than 80° C., to react said polysaccharide and amidogen compounds with the liberation of ammonia to form said uniformly 2-substituted high molecular weight polysaccharide having a $NH_2$ containing substituent carried by the second carbon of the monosaccharide units of the the uniformly substituted polysaccharide, with formaldehyde to produce said insoluble water resistant highly polymerized carbohydrate derivative product having the properties of a thermosetting resin.

3. The process for producing an insoluble water resistant highly polymerized carbohydrate derivative product having the properties of a thermosetting resin which comprises reacting a uniformly 2-substituted high molecular weight polysaccharide having a $NH_2$ containing substituent carried by the second carbon of the monosaccharide units of the uniformly substituted polysaccharide prepared by mixing a non-dialyzable higher molecular weight polysaccharide compound with a lower alkyl polyamide compound having not more than four carbons in the alkyl group, said compounds being mixed at a temperature in the range of from 80° C. to 115° C. in a nonaqueous system wherein there is provided a nonaqueous solvent for the lower alkyl amidogen compound having a boiling point at atmospheric pressure higher than 80° C., to react said polysaccharide and amidogen compounds with the liberation of ammonia to form said uniformly 2-substituted high molecular weight polysaccharide having a NH₂ containing substituent carried by the second carbon of the monosaccharide units of the uniformly substituted polysaccharide, with formaldehyde to produce said insoluble water resistant highly polymerized carbohydrate derivative product having the properties of a thermosetting resin.

4. The process for producing an insoluble water resistant highly polymerized carbohydrate derivative product having the properties of a thermosetting resin which comprises reacting a uniformly 2-substituted ester of starch polysaccharide having a NH₂ containing substituent carried by the second carbon of the glucopyranose units of the starch ester prepared by mixing starch with a lower alkyl polyamide compound having not more than four carbons in the alkyl group at a temperature in the range of from 80° C. to 115° C. in a nonaqueous system wherein there is provided a nonaqueous solvent for the lower alkyl polyamide compound having a boiling point at atmospheric pressure higher than 80° C., to react said starch and polyamide compounds with the liberation of ammonia to form said uniformly 2-substituted ester of starch polysaccharide having a NH₂ containing substituent carried by the second carbon of the glucopyranose units of the starch ester, with formaldehyde to produce said insoluble water resistant highly polymerized carbohydrate derivative product having the properties of a thermosetting resin.

5. The process for producing an insoluble water resistant highly polymerized carbohydrate derivative product having the properties of a thermosetting resin which comprises reacting a uniformly 2-substituted starch carbamate prepared by mixing starch with urea at a temperature in the range of from 80° C. to 115° C. in a nonaqueous system wherein there is provided a nonaqueous solvent for the urea having a boiling point at atmospheric pressure higher than 80° C., to react said starch and urea with the liberation of ammonia to form said uniformly 2-substituted starch carbamate, with formaldehyde to produce said insoluble water resistant highly polymerized carbohydrate derivative product having the properties of a thermosetting resin.

6. The process for producing an insoluble water resistant highly polymerized carbohydrate derivative product having the properties of a thermosetting resin which comprises reacting a uniformly 2-substituted high molecular weight polysaccharide having a NH₂ containing substituent carried by the second carbon of the monosaccharide units of the uniformly substituted polysaccharide prepared by mixing a non-dialyzable higher molecular weight polysaccharide compound with a lower alkyl polyamine compound having not more than four carbons in the alkyl group, said compounds being mixed at a temperature in the range of from 80° C. to 115° C. in a nonaqueous system wherein there is provided a nonaqueous solvent for the lower alkyl amine compound having a boiling point at atmospheric pressure higher than 80° C., to react said polysaccaride and amidogen compounds with the liberation of ammonia to form said uniformly 2-substituted high molecular weight polysaccharide having a NH₂ containing substituent carried by the second carbon of the monosaccharide units of the uniformly substituted polysaccharide, with formaldehyde to produce said insoluble water resistant highly polymerized carbohydrate derivative product having the properties of a thermosetting resin.

7. A process of forming carbohydrate derivative products which comprises the step of mixing a uniformly 2-substituted high molecular weight polysaccharide having a NH₂ containing substituent carried by the second carbon of the monosaccharide units of the uniformly substituted polysaccharide with an aldehyde to produce an insoluble water resistant highly polymerized carbohydrate derivative product having the properties of a thermosetting resin.

8. A process of forming carbohydrate derivative products which comprises the step of mixing a uniformly 2-substituted high molecular weight polysaccharide having a NH₂ containing substituent carried by the second carbon of the monosaccharide units of the uniformly substituted polysaccaride with a formaldehyde solution to produce an insoluble water resistant highly polymerized carbohydrate derivative product having the properties of a thermosetting resin.

9. A process of forming carbohydrate derivative products which comprises the step of mixing a uniformly substituted 2-carbamic acid ester of a high molecular weight polysaccharide with a formaldehyde solution to produce an insoluble highly polymerized carbohydrate derivative product having the properties of a thermosetting resin.

10. A process of forming carbohydrate derivative products which comprises the step of mixing a uniformly 2-substituted starch carbamate with a formaldehyde solution to produce an insoluble water resistant highly polymerized carbohydrate derivative product having the properties of a thermosetting resin.

11. A process of forming carbohydrate derivative products which comprises the step of mixing a uniformly 2-substituted starch carbamate with an aldehyde to produce an insoluble water resistant highly polymerized carbohydrate derivative product having the properties of a thermosetting resin.

12. A process of forming carbohydrate derivative products which comprises the step of mixing a uniformly 2-substituted starch carbamate with a formaldehyde solution and heating the mixture to produce an insoluble water resistant highly polymerized carbohydrate derivative product having the properties of a thermosetting resin.

13. A process of forming carbohydrate derivative products which comprises the step of cooking a uniformly 2-substituted starch carbamate and then mixing the cooked starch carbamate with formaldehyde to produce an insoluble water resistant highly polymerized carbohydrate derivative product having the properties of a thermosetting resin.

14. An insoluble water resistant highly polymerized carbohydrate derivative product having thermosetting resin properties consisting of a higher molecular weight glucopyranose polymer having a relatively large number of interconnected glucopyranose units each having a formula of

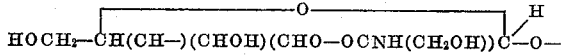

15. An insoluble water resistant highly polymerized carbohydrate derivative product having thermosetting resin properties formed by mixing an aldehyde with a uniformly 2-substituted high molecular weight polysaccharide having a NH₂ containing substituent carried by the second carbon of the monosaccharide units of the uniformly substituted polysaccharide.

References Cited in the file of this patent

UNITED STATES PATENTS 2,527,839    Morton _____ Oct. 31, 1950

FOREIGN PATENTS 480,958    Great Britain _____ Feb. 28, 1938